the cylinders and the lower half of the valve
UNITED STATES PATENT OFFICE.

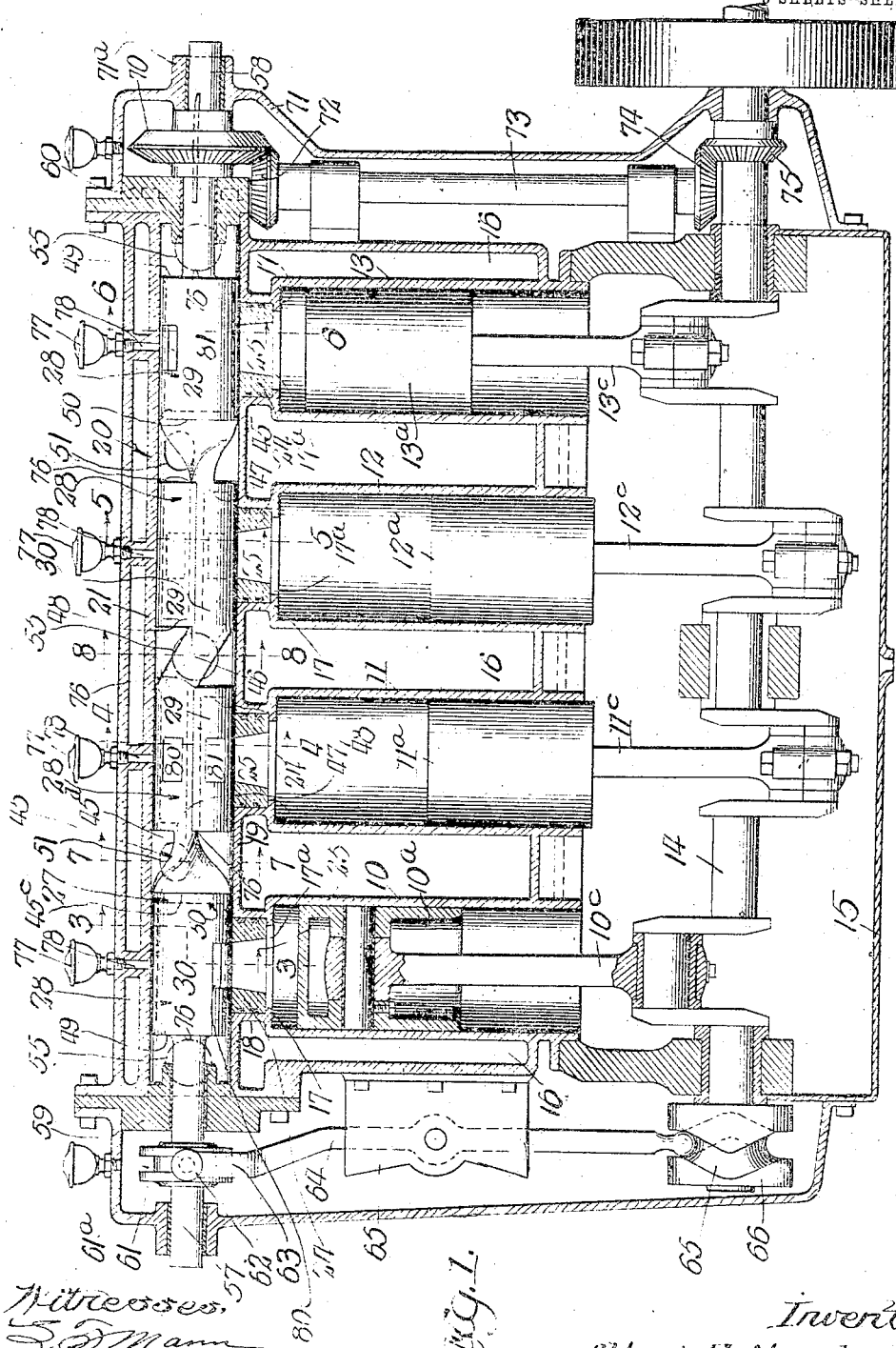

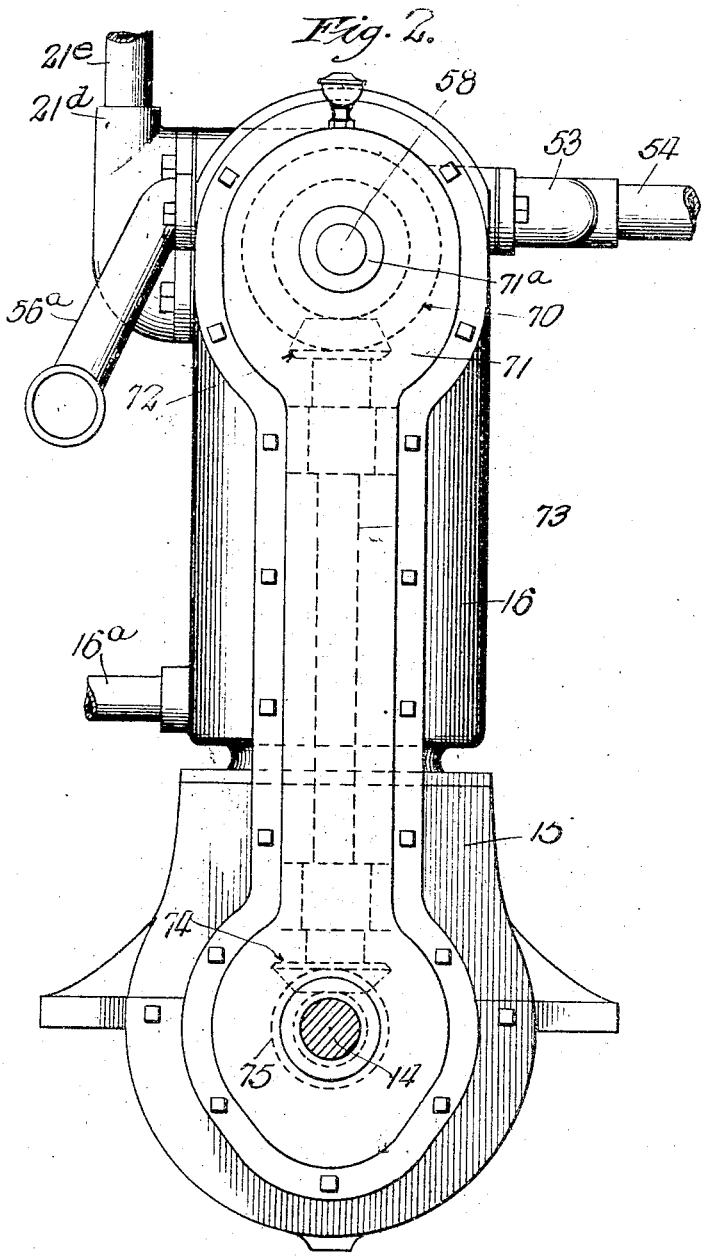

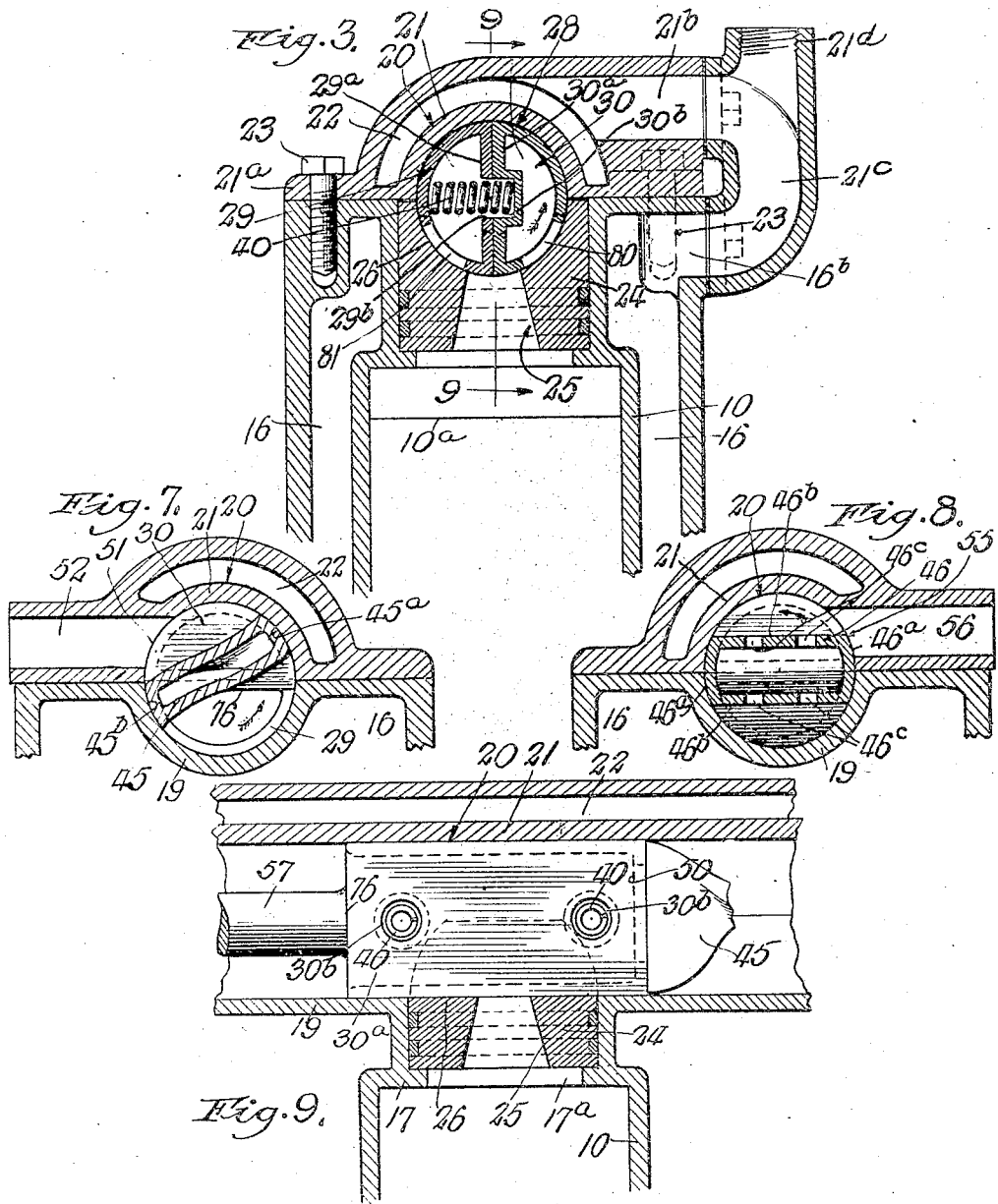

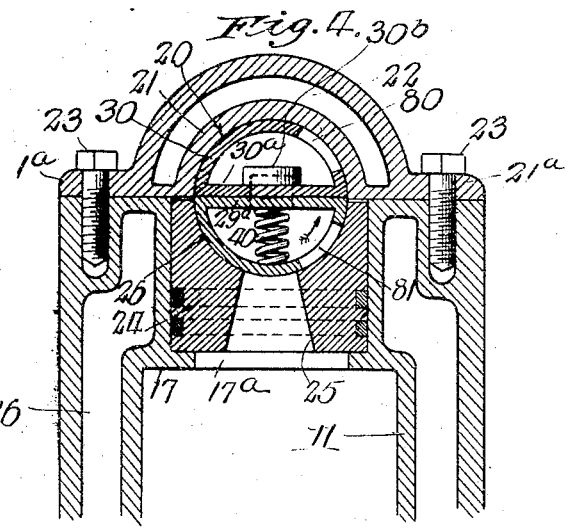
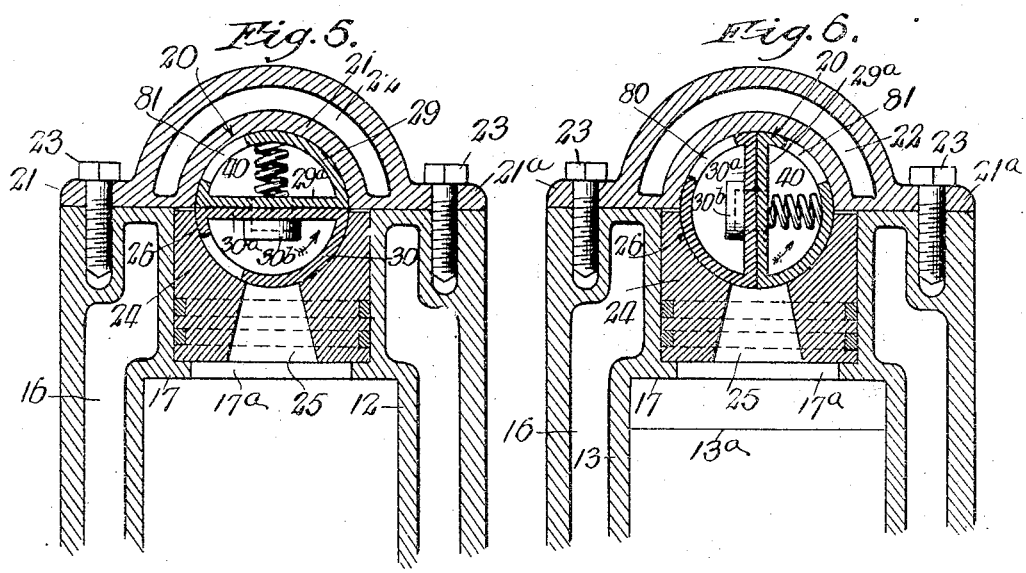

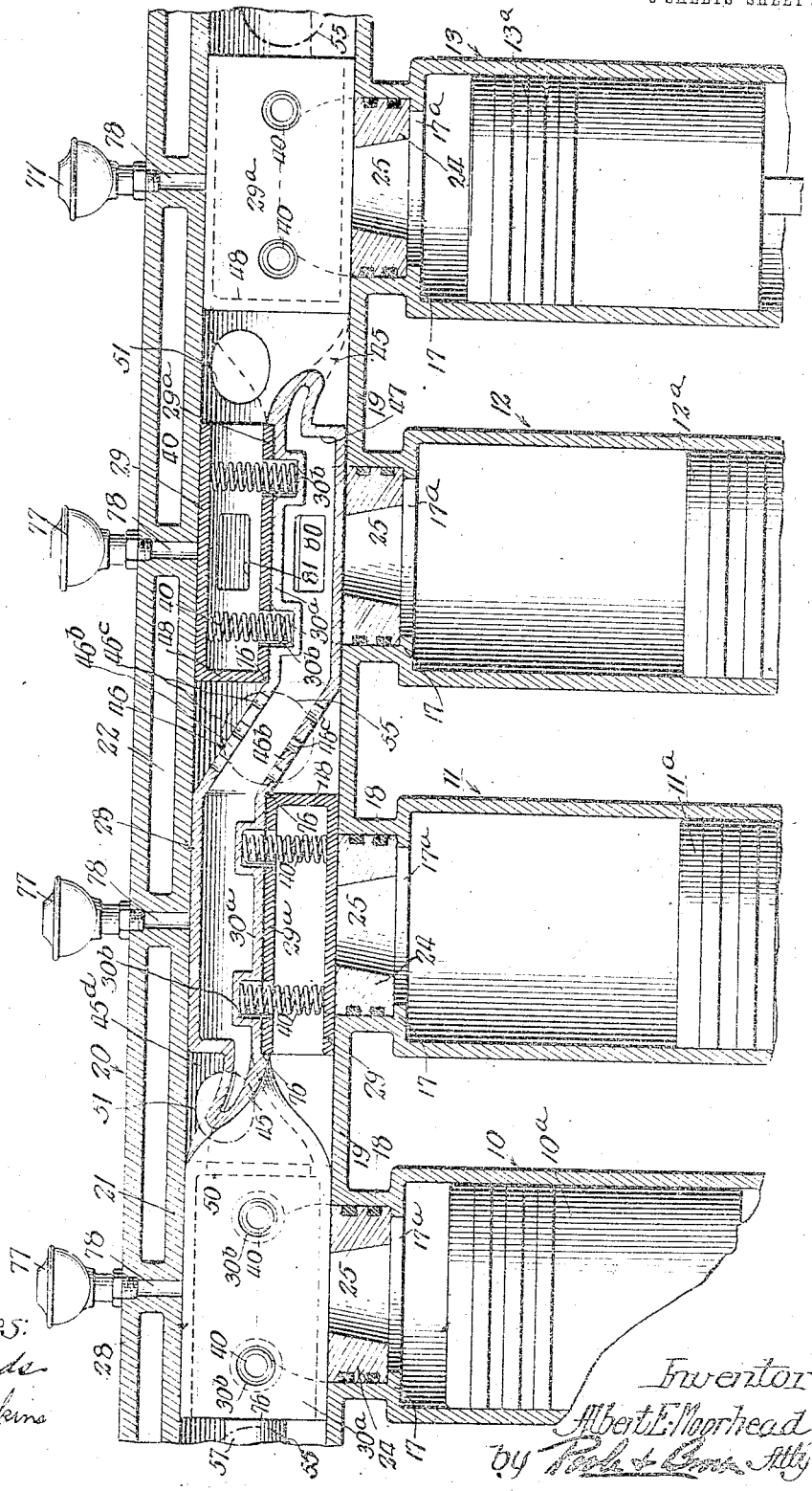

ALBERT E. MOORHEAD, OF CHICAGO, ILLINOIS, ASSIGNOR, BY MESNE ASSIGNMENTS, TO AMERICAN ROTARY VALVE COMPANY, OF CHICAGO, ILLINOIS, A CORPORATION OF ILLINOIS.

ROTARY VALVE FOR ENGINES AND THE LIKE.

1,042,712.

Specification of Letters Patent.

Patented Oct. 29, 1912.

Application filed July 28, 1911. Serial No. 640,966.

*To all whom it may concern:*

Be it known that I, ALBERT E. MOORHEAD, a citizen of the United States, and a resident of Chicago, in the county of Cook and State of Illinois, have invented certain new and useful Improvements in Rotary Valves for Engines and the Like; and I do hereby declare that the following is a full, clear, and exact description thereof, reference being had to the accompanying drawings, and to the letters of reference marked thereon, which form a part of this specification.

This invention relates to improvements in rotary valves, and as shown herein is applied to explosive engines, and consists of the matters hereinafter described and more particularly pointed out in the appended claims.

The invention, as described herein, is shown as applied to a four cycle engine, but manifestly, as will later appear, it may be applied to other types of engines and to other devices in which fluids are handled.

In the drawings—Figure 1 is a view representing a vertical section through my improved engine, the said section being taken in a plane containing the central axis of the crank shaft. Fig. 2 is a view representing an end elevation of my improved engine. Fig. 3 is a view representing on an enlarged scale, a partial vertical section through Fig. 1 on the line 3—3 thereof. Fig. 4 is a view representing a partial vertical section through Fig. 1 on the line 4—4 thereof. Fig. 5 is a view representing a vertical section through Fig. 1 on the line 5—5 thereof. Fig. 6 is a view representing a vertical section through Fig. 1 on the line 6—6 thereof. Fig. 7 is a view representing a vertical section through the valve casing on the line 7—7 of Fig. 1. Fig. 8 is a view representing a vertical section through the valve casing on the line 8—8 of Fig. 1. Fig. 9 is a view representing a longitudinal section through the valve casing on the line 9—9 of Fig. 3. Fig. 10 is a detail, vertical, longitudinal section of the valve, taken on a plane extending through the central axis thereof.

Referring now in detail to that embodiment of my invention illustrated in the drawings, 10, 11, 12 and 13 indicate the four cylinders of a four cycle engine; $10^a$, $11^a$, $12^a$ and $13^a$, the respective pistons adapted for reciprocation in said cylinders; 14, the crank shaft and $10^c$, $11^c$, $12^c$ and $13^c$, the respective connecting rods by which the several pistons are connected to the crank shaft. 15 indicates the crank casing inclosing the crank shaft. The several cylinders are provided with the usual water jackets 16, said water jackets being all connected together and supplied with water by an inlet pipe $16^a$ (see Fig. 2). Above said cylinders is located a cylindric valve casing 20 which extends the full length of the engine and contains a rotative valve member for each cylinder, said rotative valve members, as will presently appear, being all connected together to rotate as one. Each cylinder has an end wall 17 provided with a large aperture or opening $17^a$. The cylinders are provided beyond said end wall with cylindric extensions 18, each connected to and opening into the valve casing 20. As shown in the drawings, the cylinders and their extensions 18 are cast integral with a semi-cylindric shell 19 which forms the lower half of the cylindric valve casing 20. The upper half of said valve casing is formed by a semi-cylindric shell 21 which has a longitudinal flange $21^a$ secured by bolts 23 to the upper end of the main casting comprising the cylinders and the lower half of the valve casing. A water jacket 22 is formed about the upper shell 21. As shown in Figs. 2 and 3, a laterally extending passage $21^b$ opens into the water jacket 22 of the upper shell near one end thereof and said passage is connected by a U-fitting $21^c$ with a passage $16^b$ opening into one of the cylinder jackets 16. Thus the cooling water, after circulating about the cylinders and the lower half of the valve casing 21 passes into the jacket about the upper half of the same. The U-fitting $21^c$ has an opening at one side surrounded by a threaded boss $21^d$, in which is secured the end of a discharge pipe $21^e$.

Upon the end wall of each cylinder and within the cylindric extensions 18 thereof, rests a block 24 provided with a conical port opening 25 extending vertically therethrough, the larger part of said opening being adjacent to and in communication with the opening $17^a$ in the end wall of the cylinder. Said block is provided at its upper end with a semi-cylindric groove 26 which, together with the upper shell 21 forms a cylindric bearing for the rotative valve member now to be described. Said block is capable of slight endwise movement under the pressure in the cylinder, so as to be forced closely against its associated valve plug.

27 indicates the rotative valve member as a whole. Said valve member comprises a plurality of longitudinally spaced, hollow rotative valve plugs 28, one for each cylinder, and each having rotative bearing within the valve casing 20. Each valve plug 28 is of a length equal to the diameter of the associated engine cylinder, and as shown in the drawings, comprises two semi-cylindric shells 29 and 30 providing separate exhaust and inlet chambers in the valve plug. The shell 30 is closed along its diametric plane by a wall 30ᵃ. The other shell 29 is also closed along its diametric plane by a wall 29ᵃ, the two walls of the said shells 29 and 30 engaging against each other. In the wall 29ᵃ of the shell 29, near its ends, are formed holes 29ᵇ, the central axis of said holes coinciding with a diameter of the shell extending at right angles to its wall 29ᵃ. The wall 30ᵃ of the shell 30 is provided with recesses 30ᵇ, each in diametric line with one of said holes 29ᵇ of the other shell wall, and coiled expansion springs 40, 40, are located in said holes and in said recesses, and are adapted for engagement at one end against the inner cylindric surface of the shell 29 and at the other end against the bottom walls of the recesses 30ᵇ. The construction is such that the springs tend to force the two shells comprising the hollow valve plug apart, thereby causing said valve plug to have close, snug, engagement with its bearing within the valve casing. As will presently appear, the shell 29 provides for the admission of the explosive mixture into the cylinder, while the shell 30 provides for the exhaust, and said shells will be hereafter referred to respectively as the inlet valve member or shell 29 and the exhaust valve member or shell 30.

The valve plugs 28 of the several cylinders are arranged relatively to each other so that the diametric planes dividing the exhaust members 30 from the inlet members 29 of the end valve plugs are each at an angle of 90° to the said plane of the next adjacent intermediate valve plug while the said planes of the two intermediate valve plugs coincide but the relative angular positions of the inlet and exhaust members of said plugs are separated by an angle of 180°. Thus starting at the left hand end of the rotative valve member, as shown in Fig. 1, and counting toward the right, and considering the valve plug of the first cylinder as at zero (see Fig. 3), the plug of the second cylinder is at a relatively angular position of 90° (see Fig. 4); the plug of the third cylinder at an angle of 180° with that of the second cylinder and 270° with that of the first cylinder (see Fig. 5); and the plug of the fourth cylinder, at an angle of 270° with reference to the third valve plug and 450° with reference to the first valve plug (see Fig. 6), these relative angular arrangements being those required to make the cylinders fire in the usual order, that is to say, in the order of the first, the third, the fourth and the second.

The exhaust members 30 of the first and second valve plugs are connected by a hollow web 45, said web having lateral edges 45ᵃ, 45ᵇ, adapted for engagement against the inner surface of the valve casing. The ends 45ᶜ, 45ᵈ, of said web, lie substantially in the planes of the walls 30ᵃ of the exhaust members of the valve plug to which they are connected, but the intermediate part of said web is twisted through a quarter of a turn, that is to say, through an angle of 90°. The exhaust members 30 of the third and fourth valve plugs are connected by a similar web 45. The exhaust members of the intermediate valve plugs, that is to say, the second and third plugs, are connected together by an inclined, flat tube 46, having cylindric lateral walls 46ᵃ adapted for engagement with the inner surface of the valve casing and flat inclined walls 46ᵇ, in which are formed a plurality of apertures 46ᶜ (see Fig. 8). Said exhaust members open into said tube at their inner adjacent ends and have their opposite ends closed by end walls 47. The inlet members 29 of the intermediate valve plugs are closed at their adjacent ends by end walls 48, while their opposite ends, that is to say, those adjacent the webs 45, are open. The inlet members of the first and fourth valve plugs have their ends adjacent the webs 45 open, whereas their opposite ends are closed by end walls 49. The like ends of the exhaust members of said valve plugs are open while their ends adjacent said webs are closed by end walls 50, said walls having apertures by means of which the interior of said web communicates with said exhaust shells.

In the valve casing 20, adjacent the webs 45, are formed inlet ports 51 communicating with inlet passages 52 (see Fig. 7). Said inlet passages are connected by a U-fitting 53, into which opens an inlet pipe 54. Said inlet pipe is connected to a carbureter (not shown) in the usual manner. Adjacent the inclined tube 46 and at each end of the valve casing, beyond the ends of the extreme valve plugs, are located exhaust ports 55 which communicate with exhaust passages 56. Said exhaust passages are connected to exhaust pipes 56ᵃ.

The member comprising the several exhaust members of the valve plugs is provided at its ends with shaft extensions 57, 58, which have suitable bearings formed in plates 59, 60, which close the ends of the valve casing. Said shaft is adapted for longitudinal movement in its bearings, and at one end, as shown in the drawings at the left-hand end, there is fixed upon said shaft a grooved wheel 61 in the groove 61ª of which, engage pins 62 carried by a yoke 63 on the upper end of the arm 64 pivotally connected to plates 65, secured to the engine casing. The lower end of said arm engages within a cam groove 65 in a cam wheel 66 which is keyed to the crank shaft 14. By reason of this construction, the arm 64 is caused to oscillate in a vertical plane and to reciprocate the valve shaft longitudinally in its bearings. On the shaft 58 is mounted a beveled gear 70 which has splined connection with the shaft, so that the shaft will turn with the gear but is adapted to slide endwise therein. In order to hold said gear 70 from moving endwise with the shaft, the hub of said gear has a thrust bearing bearing at one end against the plate 60 and at the other end against a bearing sleeve 71ª made rigid with a casing 71 in which the end of the shaft extension 58 has bearing. The beveled gear 70 is in mesh with a beveled gear 72 keyed to the upper end of a vertical shaft 73 which has keyed to its lower end a beveled gear 74 in mesh with a beveled gear 75 fixed on the crank shaft. These gears are such that the valve member is rotated once to two revolutions of the crank shaft.

Suitable thrust members are formed on the integral valve member, of which the exhaust members of the valve plugs are part, to engage the ends of the inlet valve members 29 and prevent them from moving longitudinally with reference to the exhaust valve members. As shown in the drawings, said thrust members are formed by the webs 45, the flat tube 46, and the shaft extensions 57, 58, which are offset at their ends from the parts of the exhaust members to which they are connected, thus providing shoulders 76 which engage against the ends of the inlet valve members 29. Said shoulders hold said inlet valve members in proper relation with said exhaust valve members so that the rotative valve member, as a whole, may be reciprocated longitudinally under the action of the swinging arm 64 without disturbing the relation of the inlet and exhaust valve members to each other.

Above each valve plug is located an oil cup 77 adapted to supply oil to a vertical oil passage 78 which opens through the top wall of the valve casing. By reason of the longitudinal reciprocatory movement of the rotary valve member, this oil is evenly distributed over the outer surface of the valve plugs.

In the cylindric wall of each valve member, 29 and 30, are formed ports, an exhaust port 80 in the exhaust valve member and an inlet port 81 in the inlet valve member. Said ports are spaced from each other an angular distance of 90° and the diametric plane between said valve members divides this angle into two equal parts. Said ports are so arranged relatively to the length of the valve plug that they are adapted to come to register in succession with the upper smaller end of the port opening 25 in the cylindric block 24.

The operation of the engine is as follows: Consider the parts in the relative positions illustrated in the drawings, with the rotative valve member 28 rotating in the direction indicated by the arrows. The piston of the first cylinder (numbering from the left) has just completed its exhaust stroke and, is about to begin its inlet stroke, the exhaust port 80 of the associated valve plug having just passed the cylinder port opening 25 and the inlet port 81 being just about to come to register with said cylinder port opening. The piston of the second cylinder has just completed its inlet stroke and is just about to begin its compression stroke. In this position of the rotative valve member, the web 45 between the first two valve plugs is in a position to direct the explosive mixture adapted to enter the valve casing 20 through the inlet port 51, into the open end of the inlet valve member 29 of the first valve plug and to cut off said port 51 so as to prevent any explosive mixture passing therefrom to the open end of the inlet valve member of the second valve plug (see Fig. 7). The first piston proceeds on its inlet stroke, and as it does so, the inlet port 81 comes to register with the cylinder port 25. A supply of explosive mixture is drawn into the cylinder, the same passing from the inlet port 51 into the valve casing, then between the wall of the valve casing and the web 45 into the open end of the inlet valve member 29 of the first valve plug, and thence through the ports 81 and 25 into the cylinder. In the meantime the second piston has been making its compression stroke. By reason of the pressure of the expansion springs 40, the valve members are held tightly engaged against the inner surface of the valve casing, thus making a tight joint and preventing any possibility of leakage under the force of the compression stroke. In addition the pressure of the gas against the exposed base of the plug 24, forces said plug 24 up against the valve plug, thus making a tight joint at all points of the periphery of the valve plug.

By the time the pistons have reached the ends of their respective strokes, the valve member has rotated through an angle of 90° and the ports of the first valve plug have come to the position occupied by those of the second valve plug, shown in the drawings, and those of the second to the position occupied by those of the fourth valve plug, shown in the drawings. The second cylinder is now fired and the piston of the first proceeds on its compression stroke. At the end of this stroke the ports of the first valve plug occupy the position of those of the fourth, shown in the drawings, and those of the second occupy the position of those of the third, shown in the drawings. The first cylinder is now fired, and the piston of the second proceeds on its exhaust or scavenger stroke. During this stroke the exhaust port 80 of the second valve plug comes to register above the cylinder port 25 of the second cylinder, and the exploded gases are forced into the exhaust member 30 of the said valve plug whence they pass in either direction, in one direction into the flat tube 46, thence through the holes 46ᵃ in the inclined walls thereof into the valve casing and so to the exhaust port 55, whence they escape to the outer air, or in the opposite direction through the hollow web 45 to the exhaust member of the first valve plug and through the open left-hand end thereof into the casing and through the exhaust port 55 near the end of said casing. At the end of this stroke the port openings of the first valve plug have come to that position in which the third valve plug is shown in the drawings, and the second valve plug has come to that position in which the first valve plug is shown in the drawings. The first piston now proceeds on its exhaust or scavenger stroke, and the second, upon its inlet stroke, the exhaust port 80 of the first valve plug during this stroke coming to register with the cylinder port 25 of the first cylinder and the inlet port 81 of the second valve plug coming to register with the cylinder port 25 of the second cylinder. When in this position the web 45 cuts off the associated inlet port 51 from communication with the open end of the inlet member of the first valve plug and directs the explosive mixture entering therethrough into the open end of the inlet valve of the second valve plug so that there is free passage from said port 51 between the valve casing wall and the web 45, through the inlet valve member of the second valve plug and thence to the cylinder. During this stroke the exploded gases in the first cylinder pass into the exhaust member of the associated valve plug and pass through the open end thereof into the valve casing whence they pass through the exhaust port 55 at the left-hand end of the valve casing to the open air or may pass in the opposite direction through the hollow web 45 to the exhaust member of the second valve plug, and thence through the flat tube 46 to the port 55 at the middle of the valve casing. At the end of this stroke, the various parts have again come to the initial position indicated in the drawings. In the meantime the other cylinders and their valve plugs will have passed through like cycles as will be readily understood.

By providing the longitudinal reciprocatory movement of the valve member in addition to its rotative movement, irregular wear in the bearing surfaces of said valve member and of the valve casing is prevented, and the said surfaces are caused to maintain their cylindric form and uniform contact with each other, while the distribution of lubricant between the said surfaces is greatly aided.

The valve mechanism embracing the general features hereinbefore described and illustrated in the accompanying drawings, while shown as applied to a certain type of engine, may, obviously, be applied to other types of engines, or to devices used for pumping fluids, for compressing or exhausting gases, or for other purposes. Each valve mechanism may, moreover, be variously modified or changed in its details and arrangement of parts without departure from the invention.

I claim as my invention:

1. The combination of a cylinder, a valve casing provided with a port in communication with the cylinder and with inlet and exhaust passages, a rotative valve plug having bearing in said casing, said valve plug comprising semi-cylindric shells, one constituting an inlet member and the other an exhaust member, and each provided in its cylindric wall with a port adapted to register with the cylinder port, said inlet and exhaust shells being provided with openings for communication with the inlet and exhaust passages of the valve casing, and means applied to yieldingly force apart the said valve shell members.

2. The combination of a cylinder, a valve casing provided with a port in communication with the cylinder and with inlet and exhaust passages, a rotative valve plug having bearing in said casing, said valve plug comprising semi-cylindric shells, one constituting an inlet member and the other an exhaust member, and each provided in its cylindric wall with a port adapted to register with the cylinder port, said inlet and exhaust shells being provided with openings for communication with the inlet and exhaust passages of the valve casing, and an expansion spring adapted for forcing said shells apart.

3. The combination of a cylinder, a valve casing provided with inlet and exhaust passages and with a port in communication with said cylinder, a rotative valve plug having bearing in said casing, said valve plug comprising semi-cylindric shells, one constituting an inlet member and the other an exhaust member, and each provided in its cylindric wall with a port adapted to register with the cylinder port, and said shells being open, one at one end and the other at the opposite end, of the valve plug, and the open ends of the inlet and outlet shells being adapted for communication with the inlet and exhaust passages of the valve casing, and means applied to yieldingly force apart the said valve shell members.

4. The combination of a cylinder, a valve casing provided with inlet and exhaust passages and with a port in communication with the cylinder, a movable block forming a part of the wall of the valve casing and containing said cylinder port, said block having a part providing an area exposed to the interior of the cylinder, a rotative valve plug having bearing in said casing, said valve plugs comprising semi-cylindric shells, one constituting an inlet member and the other an exhaust member, and each provided in its cylindric wall with a port adapted to register with the cylinder port; said inlet and outlet shells being provided with openings for communication with the inlet and exhaust passages of the valve casing, and means acting to yieldingly force apart said valve shell members.

5. In combination with a cylinder, a valve casing provided with a cylindric valve chamber and with inlet and exhaust passages, a rotative cylindric valve plug having bearing in said valve chamber, a movable block provided with a port connecting the interior of the cylinder with the valve chamber; one end of said block having an area exposed to the interior of the cylinder and the opposite end of said block being wider than the diameter of the valve plug and provided with a recess, semi-circular in cross-section, forming a bearing surface adapted for contact with one-half of the circumference of the valve plug; the said valve plug having one-half of its cylindric surface in bearing contact with the inner surface of the valve casing and one-half of its circumference in bearing contact with the said movable block, and being provided with circumferentially spaced inlet and exhaust ports adapted to coact with said port in the movable block, and means acting to give continuous endwise, reciprocatory motion to said valve plug, simultaneously with its rotative movement.

6. The combination of a cylinder, a valve casing provided with a cylindric valve chamber, with inlet and exhaust passages and a port in communication with the cylinder, a rotative cylindric valve plug having bearing in said casing, said valve plug comprising semi-cylindric shells, one constituting an inlet member and the other an exhaust member, and each provided in its cylindric wall with a port adapted to register with the cylinder port, said inlet and exhaust shells being provided with openings for communication with the inlet and exhaust passages of the casing, means acting to yieldingly force apart said valve member shells, and means acting to give continuous endwise reciprocatory motion to said valve plug, simultaneously with its rotative movement.

7. The combination of a cylinder, a valve casing provided with a cylindric valve chamber, with inlet and exhaust passages, and with a port communicating with the cylinder, a movable block forming a part of the wall of the valve casing and containing said cylinder port, said block having a part providing an area exposed to the interior of the cylinder, a rotative valve plug having bearing in the said casing, said valve plug comprising semi-cylindric shells, one constituting an inlet and the other an exhaust member, and each provided in its cylindric wall with a port adapted to register with the cylinder port, said inlet and exhaust shells being provided with openings for communication with the inlet and exhaust passages of the casing, means acting to yieldingly force apart said valve shell members, and means acting to give continuous, endwise reciprocatory motion to said valve plug, simultaneously with its rotative movement.

8. The combination of a valve casing provided with a cylindric valve chamber, with inlet and exhaust passages and with a port for both inlet and exhaust, a rotative cylindric valve plug having bearing in said casing, said valve plug comprising semi-cylindric shells, one constituting an inlet member and the other an exhaust member, and each provided in its cylindric wall with a port adapted to register with said inlet and exhaust ports, said inlet and exhaust shells being provided with openings for communication with the inlet and exhaust passages of the casing, interlocking means on the said shells adapted to hold the same from relative endwise movement, means acting to yieldingly force apart said valve member shells, and means acting on one of said shells to give continuous, endwise reciprocatory motion to said valve plug, simultaneously with its rotative movement.

9. The combination with a valve casing having a cylindric valve chamber and provided with a plurality of longitudinally spaced ports for both inlet and exhaust, of a rotative valve member having bearing in said casing, said valve member comprising a plurality of longitudinally spaced, hollow, cylindric valve plugs, one for each inlet and exhaust port, each valve plug consisting of two semi-cylindric shells, one constituting an inlet and the other an exhaust member, one opening at one end and the other opening at the opposite end of said plug into the valve chamber, and each provided with a port in its cylindric wall adapted to register with one of the inlet and exhaust ports, connecting members rigidly uniting one end of one of the shell members of each valve plug with the adjacent end of one of the shell members of an adjacent valve plug, and means acting to yieldingly force apart the shell members of each plug, said valve casing being provided with inlet and exhaust passages adapted for communication with the open ends of the inlet and exhaust shell members.

10. The combination with a valve casing having a cylindric valve chamber and provided with two longitudinally spaced ports for both inlet and exhaust, of a rotative valve member having bearing in said casing, said valve member comprising two longitudinally spaced, hollow, cylindric valve plugs, one for each inlet and exhaust port, each valve plug being provided with an inlet and an exhaust chamber, one opening at one end and the other at the opposite end of the plug into the valve chamber, and in its cylindric wall with an inlet port and an exhaust port, both adapted to register with one of said inlet and exhaust ports, and a spirally twisted, tubular web member extending between said plugs and forming a passage connecting the exhaust chambers of the plugs, said valve casing being provided with inlet and exhaust passages adapted for communication with the open ends of the inlet and exhaust chambers.

11. The combination with a valve casing having a cylindric valve chamber and provided with two longitudinally spaced ports for both inlet and exhaust, of a rotative valve member having bearing in said casing, said valve member comprising two longitudinally spaced, hollow, cylindric valve plugs, one for each inlet and exhaust port, each valve plug being provided with an inlet and an exhaust chamber, one opening at one end and the other at the opposite end of the plug into the valve chamber, and in its cylindric wall with an inlet and exhaust port, both adapted to register with one of said inlet and exhaust ports, and a spirally twisted web member extending between said plugs and having its lateral edges in bearing engagement with the valve casing, said valve casing being provided with inlet and exhaust passages adapted for communication with the open ends of the inlet and exhaust chambers.

12. The combination with a valve casing having a cylindric valve chamber and provided with two longitudinally spaced ports for both inlet and exhaust, of a rotative valve member having bearing in said casing, said valve member comprising two longitudinally spaced, hollow, cylindric, valve plugs, one for each inlet and exhaust port, each valve plug being provided with an inlet and an exhaust chamber, one opening at the end and the other at the opposite end of the plug into the valve chamber, and provided in its cylindric wall with an inlet and an exhaust port, both adapted to register with one of said inlet and exhaust ports, and an apertured, flattened, tubular member extending between said plugs and connected with the open ends of the exhaust chamber, said valve casing being provided with an exhaust passage adapted for communication, through said tubular member, with the adjacent open ends of the exhaust chambers and with inlet passages adapted for communication with the open ends of the inlet chambers.

13. The combination with a valve casing having a cylindric valve chamber and provided with two longitudinally spaced ports for both inlet and exhaust, of a rotative valve member having bearing in said casing, said valve member comprising two longitudinally spaced, hollow, cylindric valve plugs, one for each inlet and exhaust port, each valve plug being provided with an inlet and exhaust chamber one opening at one end and the other at the opposite end of said plug into the valve chamber, and in its cylindric wall with an inlet and an exhaust port, both adapted to register with one of said inlet and exhaust ports, and an apertured, flattened, tubular member extending between said plugs and connected with the open ends of the exhaust chambers, said tubular member having its side margins in bearing engagement with said casing, said valve casing being provided with an exhaust passage adapted for communication through said tubular member with the open ends of said exhaust chambers, and with inlet passages adapted for communication with the open ends of the inlet chambers.

14. The combination with a valve casing having a cylindric valve chamber and provided with a plurality of longitudinally spaced ports for both inlet and exhaust, of a rotative valve member having bearing in said casing, said valve member comprising a plurality of longitudinally spaced, hollow, cylindric valve plugs, one for each inlet and exhaust port, each valve plug being provided with an inlet and an exhaust chamber, one opening at one end and the other at the other end of said valve plug into said valve chamber, and in its cylindric wall with an inlet port and an exhaust port, both adapted to register with one of the inlet and exhaust ports, twisted, tubular web members connecting with each other the adjacent, closed ends of the exhaust chambers, an apertured, flattened, tubular member connecting with each other the adjacent open ends of the said exhaust chambers, said valve casing being provided with inlet and exhaust passages adapted for communication with the open ends of the inlet and exhaust chambers.

15. The combination with a valve casing having a cylindric valve chamber and provided with two longitudinally spaced ports for both inlet and exhaust, of a rotative valve member having bearing in said casing, said valve member comprising two longitudinally spaced, hollow, cylindric valve plugs, one for each inlet and exhaust port, each valve plug consisting of two semi-cylindric shells, one constituting an inlet member and the other an exhaust member, each provided with a port on its cylindric wall adapted to register with one of said inlet and exhaust ports, the inlet shell members opening at the adjacent ends of the plugs and the exhaust shell members opening at the opposite ends of said plugs into the valve chamber, a spirally twisted, tubular web member rigidly connecting with each other the closed ends of the exhaust shell members and forming an exhaust passage between the same, and means acting to yieldingly force apart the shell members of each valve plug, said valve casing being provided with inlet and exhaust passages adapted for communication with the open ends of the inlet and exhaust shell members.

16. The combination with a valve casing having a cylindric valve chamber and provided with two longitudinally spaced ports for both inlet and exhaust, of a rotative valve member having bearing in said casing, said valve member comprising two longitudinally spaced, hollow, cylindric valve plugs, one for each inlet and exhaust port, each valve plug consisting of two semi-cylindric shells, one constituting an inlet member and the other an exhaust member, and each provided with a port in its cylindric wall adapted to register with one of said inlet and exhaust ports, the exhaust shell members opening at the adjacent ends of the plugs and the inlet shell members opening at the opposite ends of said plugs into the valve casing, an apertured, flattened, tubular member rigidly connecting with each other the adjacent open ends of the exhaust shell members, and means acting to yieldingly force apart the said shell members of each valve plug, said valve casing being provided with an exhaust passage adapted for communication, through said tubular member, with the open ends of the exhaust shell members and with inlet passages adapted for communication with the open ends of the inlet shell members.

17. The combination with a cylindric valve casing provided with a plurality of longitudinally spaced ports for both inlet and exhaust, a rotative valve member having bearing in said casing, said rotative valve member comprising a plurality of longitudinally spaced, hollow, cylindric valve plugs, one plug for each inlet and exhaust port, each valve plug comprising semi-cylindric shells constituting an exhaust shell member and an inlet shell member, the one opening at one end, and the other opening at the opposite end of the plug, into the valve chamber, and each provided with a port in its cylindric wall adapted to register with one of said inlet and exhaust ports, means rigidly connecting all of one set of said valve shells, and means acting to yieldingly force apart the associated valve plug shell members, said casing being provided intermediate said valve plugs and at its ends with inlet and exhaust ports arranged in alternation.

18. The combination with a cylindric valve casing provided with a plurality of longitudinally spaced ports for both inlet and exhaust, of a rotative valve member having bearing in said casing, said rotative valve member comprising a plurality of longitudinally spaced valve plugs, one plug for each inlet and outlet port, each valve plug comprising semi-cylindric shells, constituting an exhaust shell member and an inlet shell member, the one opening at one end and the other opening at the opposite end of the plug into the valve casing, and each provided with a port in its cylindric wall adapted to register with one of the inlet and outlet ports, twisted web members connecting the adjacent closed ends of the exhaust shell members, flattened, apertured, tubular members connecting the adjacent open ends of the exhaust shell members, expansion springs adapted for forcing the associated valve plug shell members apart, said casing being provided opposite said web members with inlet ports, and opposite said flattened tubular members and at its ends with exhaust ports, end plates closing the ends of said valve casing, and shaft extensions rigid with the exhaust shell members of the end valve plugs and having bearing in the said plates.

19. The combination with a cylindric valve casing provided with a plurality of longitudinally spaced ports for both inlet and exhaust, of a rotative valve member comprising a plurality of longitudinally spaced valve plugs, one plug for each inlet and exhaust port, each valve plug comprising semi-cylindric shell constituting an exhaust shell member and an inlet shell member, the one opening at one end and the other opening at the opposite end of the plug into the valve casing, and each provided with a port in its cylindric wall adapted to register with one of the inlet and exhaust ports, means rigidly connecting the exhaust shell members with each other, means acting to yieldingly force apart the associated shell members of each valve plug, said casing being provided with inlet and exhaust passages adapted for communication with the open ends of said inlet and exhaust shell members, end plates closing the ends of said valve casing, shaft extensions made rigid with the exhaust shell members of the end valve plugs and having bearings in said end plates, said bearings affording both rotative movement and longitudinal reciprocatory movement in the shaft extensions, means acting on one of said shaft extensions for rotating the valve, and means acting on one of said shaft extensions for imparting longitudinal reciprocatory movement to said valve member.

In testimony, that I, claim the foregoing as my invention I affix my signature in the presence of two witnesses, this 25th day of July A. D. 1911.

ALBERT E. MOORHEAD.

Witnesses:
GEORGE R. WILKINS,
T. H. ALFREDS.